N. S. TWIFORD, DEC'D.
G. A. TWIFORD, ADMINISTRATRIX.
FLOW REGULATING DEVICE.
APPLICATION FILED OCT. 12, 1907.
937,728.
Patented Oct. 19, 1909.
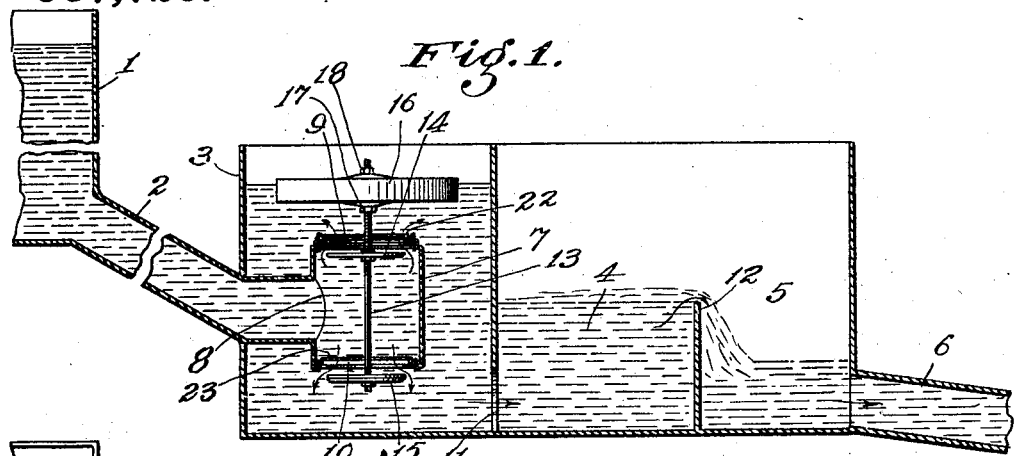
Fig. 1.
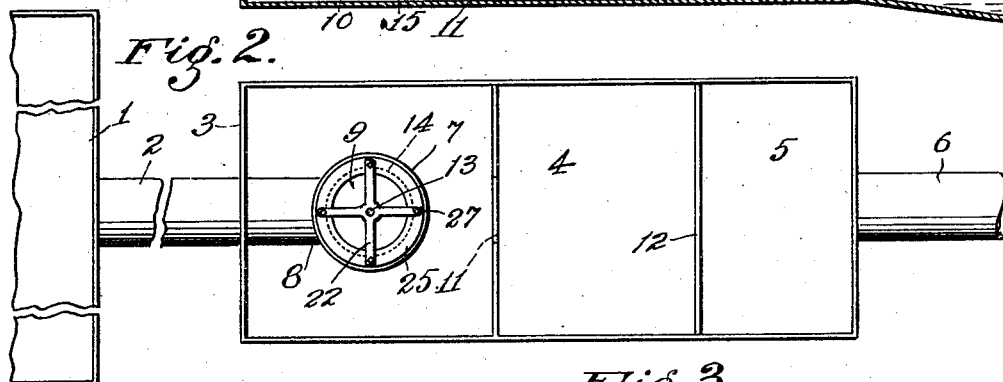
Fig. 2.
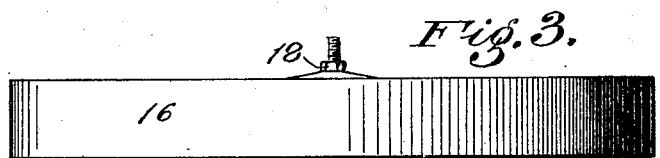
Fig. 3.
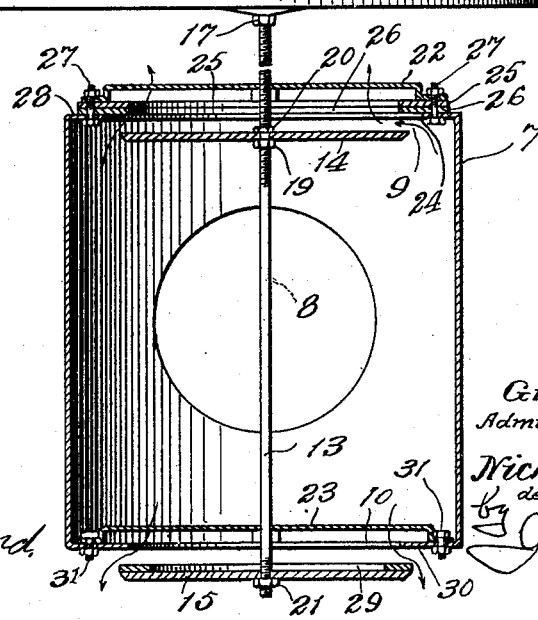
Witnesses
C. C. Holly.
J. Townsend
Grace A. Twiford
Administratrix of the Estate of
Nicholas S. Twiford
deceased. Inventor
by James P. Townsend
his Atty.

UNITED STATES PATENT OFFICE.

GRACE A. TWIFORD, OF POMONA, CALIFORNIA, ADMINISTRATRIX OF NICHOLAS S. TWIFORD, DECEASED.

FLOW-REGULATING DEVICE.

937,728.  Specification of Letters Patent.  Patented Oct. 19, 1909.

Application filed October 12, 1907. Serial No. 397,211.

*To all whom it may concern:*

Be it known that NICHOLAS S. TWIFORD, deceased, late a citizen of the United States, and resident of Pomona, in the county of Los Angeles and State of California, did invent a new and useful Flow-Regulating Device, of which the following is a specification.

The object of this invention is to provide superior automatic means for regulating the flow of liquid from a pipe under varying pressures for irrigation and for other purposes.

The accompanying drawings illustrate the invention.

Figure 1 is a fragmental view of a flow-regulating device embodying this invention. Fig. 2 is a plan of the device shown in Fig. 1, omitting the float. Fig. 3 is an enlarged vertical sectional detail of the flow-regulator.

1 indicates a reservoir subject to variations of level of the liquid contained therein; 2 is a pipe leading therefrom; 3 is a float-chamber; 4, a weir chamber; 5, the head-box for a distributing conduit 6; 7 is a valve-case in the float-chamber 3, and provided with an inlet 8 leading from the pipe 2 and with upper and lower outlets 9, 10, so that water flowing through the pipe 2 enters the valve-case 7 through the inlet 8 and flows outward from said valve-case, both up and down, as indicated by the curved arrows.

11 is an outlet from the float chamber 3 into the weir chamber 4, below the level of the weir 12.

13 is a valve-stem carrying two valves 14 and 15 for the outlets 9 and 10 from the valve-case 7.

16 is a float to which the valve-stem 13 is secured by suitable means, as the nuts 17, 18, which enable the float to be adjusted relative to the valves 14, 15, if desired. One of said valves may also be adjustably mounted on the valve-stem as by nuts 19, 20.

21 is a nut by which the lower valve 15 is fastened to the valve-stem 13.

22 and 23 designate cross-bar guides at the top and bottom of the valve, also for guiding the valve-stem 13. The valve-case 7 has a hole 24 in its top, of greater diameter than the upper valve 14, so that said valve may be inserted and withdrawn from the valve-case.

25 is an annular valve-seat-plate, and 26 is a gasket between said seat and the top of the valve-case 7 to form, together with said plate, a seat for the upper valve 14. 27 designates bolts by which said plate 25 and valve-seat-gasket 26 are fastened to the top flange 28 of the valve-case.

29 is a gasket on the upper face of the lower valve to seat against the valve-seat-flange 30 at the lower end of the valve-case.

The upper cross-bar guide 22 is held in place by the bolts 27, and the lower cross-bar-guide 23 is held in place by bolts 31.

The float-chamber 3 is of sufficient depth to allow a float carried by liquid within the float-chamber to operate the valves 14 and 15 to fully open and close the outlets 9, 10.

In practice, the valve-plates 14, 15, and the float 16 will be adjusted relative to each other and to the outlets 9 and 10, so that when the liquid rises to a determined height in the float chamber the valves will stand at a determined distance from their respective seats. The flow at the outlet 11 from the float-chamber is dependent upon the cross-sectional area of said outlet 11 and its depth below the top of the weir 12 and below the level of the liquid in the float chamber 3. Consequently, whenever the pressure of the liquid in the pipe 2 is excessive, the valve changes its position as the level of the liquid in the valve-chamber 3 rises.

The area of the outlets 9 and 10 is comparatively large, so that the valves 14 and 15 in practice stand very close to their valve-seats when open, whereby a slight variation in elevation of the float 16 will cause a great variation in the flow of liquid; consequently, the valve is extremely sensitive, and a variation of, say, one-half inch more or less, in depth in the float-chamber 3 will cause a complete cutting off of the flow.

By arranging the valves oppositely, as shown, one being outside and the other being inside the case, and both closing against their seats when the float rises, and receding from their seats when the float falls, a simple, effective operation is secured and the valve is perfectly balanced against interfering pressures.

I claim:—

1. A float chamber provided with an outlet, a float in said chamber, a valve-case in said chamber provided with openings at its top and bottom, liquid supply means opening into said valve case, cross-bar guides, an annular valve seat plate fastened to the case above the top opening, cross-bar guides fastened to said case above said outlets respectively, a valve stem extending through said guides and secured to said float, and valves secured to the valve stem for closing said outlets, one of said valves being adjustably mounted on the valve stem.

2. The combination with a source of water supply, of a pipe communicating with the water supply, a float chamber into which the pipe discharges, a weir chamber connected to the float chamber, a head box connected to the weir chamber, a distributing conduit leading from the head box, a float in the float chamber, a valve case in the float chamber with openings at its top and bottom, said valve-case being fixed upon the discharge end of the pipe leading into the float chamber; so that the water pressure is between the openings; valves for said openings, said valves being connected together for simultaneous operation and adjustable relative to each other, and said valves being connected to the float.

3. A flow regulating device comprising the combination with a source of water-supply, of a float-chamber, a pipe leading from the source of water-supply through the wall of the float-chamber, a valve-case upon the end of the pipe in the float-chamber and having openings above and below the pipe; valves for closing said openings, said valves being connected together; a float for operating the valves, a weir chamber communicating with the float-chamber, a head box communicating with the weir chamber, and a distributing-pipe leading from the head box.

In testimony whereof, I have hereunto set my hand at Los Angeles California this 5th day of October 1907.

GRACE A. TWIFORD,
*Administratrix of the estate of Nicholas S. Twiford, deceased.*

In presence of—
JAMES R. TOWNSEND,
M. BEULAH TOWNSEND.